United States Patent [19]

Franklin

[11] 4,205,261
[45] May 27, 1980

[54] ULTRACENTRIFUGE OVERSPEED DISK DETECTION SYSTEM

[75] Inventor: Robert C. Franklin, Los Gatos, Calif.

[73] Assignee: Beckman Instruments, Inc., Fullerton, Calif.

[21] Appl. No.: 924,270

[22] Filed: Jul. 13, 1978

[51] Int. Cl.² .............................................. H02P 5/06
[52] U.S. Cl. .................................... 318/480; 233/1 B; 233/24; 318/313
[58] Field of Search ................ 318/313, 480, 32, 449, 318/450, 463, 464; 233/24, 26, 1 B; 361/51; 340/672

[56] References Cited

U.S. PATENT DOCUMENTS

| | | | |
|---|---|---|---|
| 3,164,432 | 8/1964 | Johnson | 324/175 |
| 3,691,440 | 9/1972 | Haddock | 318/313 |
| 3,746,247 | 7/1973 | Camilliere | 318/313 |
| 3,809,956 | 5/1974 | Burkel et al. | 361/51 |
| 3,809,982 | 5/1974 | Cook | 318/313 |

Primary Examiner—David Smith, Jr.
Attorney, Agent, or Firm—R. J. Steinmeyer; F. L. Mehlhoff; Frank J. Kowalski

[57] ABSTRACT

A method and apparatus for detecting the absence of a coded overspeed disk used to indicate the maximum design speed of a rotor which is rotatably connected to a high speed centrifuge. Two donut-shaped coded disks, one mounted on the drive shaft on the centrifuge and the other mounted on the centrifuge rotor are utilized. Optical emitter sensor assemblies are used to produce speed control and overspeed signals. By sensing the light reflected back to the optical sensor from the drive system hub, the rotational speed of the centrifuge is indicated. By sensing the light reflected back to the optical sensor from the overspeed disk mounted on the rotor, the rotation of the rotor is detected. In the absence of an overspeed disk, the speed control frequency will exceed that of the overspeed disk.

14 Claims, 7 Drawing Figures

ULTRACENTRIFUGE OVERSPEED DISK DETECTION SYSTEM

BACKGROUND OF THE INVENTION

The present invention relates to safety devices used in conjunction with high speed centrifuge devices and, more particularly, to a method and apparatus for detecting the absence of a coded disk fixed to the base of the rotor to indicate the maximum design speed of the rotor. In present centrifuge systems, the rotor may be changed to permit the use of one type of rotor for high speed while another type, usually less expensive, for low speed applications. Overspeed indicators are provided as a safety device on each rotor to indicate its maximum design speed. Centrifuge rotors, as well as any rotating devices, can be extremely hazardous when driven at a rotational speed in excess of their design maximum. It is well known in the art that a centrifuge rotor driven in excess may explode due to high centripetal and centrifugal forces. To prevent this occurrence, coded disks are fastened to each rotor to indicate its maximum safe rotational speed.

Prior art has disclosed several systems for determining the presence of an overspeed disk, all of which have deficiencies.

One system is to use a single coded disk on the rotor to indicate rotational speed when used in conjunction with a tachometer. In this system the disk consists of highly polished and darkened areas. At startup, the sensor will determine the intensity of the light reflected from the disk. This system has its deficiency in that should the rotor stop at a point where a darkened area is opposite the light source, zero light intensity will be received by the detector. Furthermore, should the disk have fallen off, the natural reflective qualities of the metal below the disc could reflect enought light to indicate the presence of the overspeed disk on the centrifuge startup.

Another system, which also uses a single coded disk, operates on the time between darkened areas on the disk. Should the time difference between darkened areas be too great during startup, a protective circuit will disable the centrifuge. This system has its deficiency as an outgrowth of the manner in which overspeed disks are fixed to the rotor. Overspeed discs adhere to the rotor by the use of an adhesive. Should the disk fall off, portions of the rotor will reflect light through the natural reflective properties of the metal rotor while other portions will disperse the light due to adhesive residue. As such, the adhesive could block the reflecting of the light in such a manner as to indicate the presence of an overspeed disk. When this occurs, the centrifuge will operate without the safety of an overspeed indication and may exceed the maximum design speed of the rotor.

A third type of system which prior art has disclosed consists of two concentric coded disks, one of which is used to indicate overspeed while the other indicates rotational speed. The disk used as an indication of overspeed comprises a donut-shaped disk having a darkened area and a light reflecting area. The light reflecting area is proportionate to the maximum design speed of the rotor in use. By lengthening the area which is light reflective, the higher maximum design speed of the rotor is indicated. A light source transmits light to the reflective area which issues a pulse having a length proportionate to the reflective area. The leading edge of this reflective area pulse triggers a constant pulse generated by associated circuitry. The reflective pulse is compared with the constant pulse to determine whether the rotor maximum design speed has been exceeded. In the absence of the overspeed disk, the natural reflective properties of the metal rotor will indicate capability for an infinite speed and never trigger the constant pulse for comparison. Should some adhesive remain behind triggering the constant pulse for comparison, a reflective pulse indicating a maximum design speed greater than the true maximum design speed of the rotor may be present.

These prior art systems can be found in U.S. Pat. No. 3,436,637 to Robert J. Ehret; in U.S. Pat. No. 3,921,047 to Alan W. Carter et al. and in U.S. Pat. No. 3,832,614 to David W. Olliffe. Additional prior art methods for overspeed detection and rotational speed determination can be found in U.S. Pat. No. 3,691,440 to Logan D. Haddock; U.S. Pat. No. 3,809,982 to Kenneth J. Cook; U.S. Pat. No. 3,777,233 to Luc Yves Natens; U.S. Pat. No. 3,970,245 to Hans-Peter Aeschlimann; U.S. Pat. No. 3,746,247 to John Camilliere; U.S. Pat. No. 3,731,301 to John Christopher Davis; U.S. Pat. No. 3,462,670 to W. E. Waye; U.S. Pat. No. 3,582,699 to Rosario S. Badessa and in U.S. Pat. No. 3,292,068 to E. J. Holden. Although the foregoing patents disclose systems for overspeed and rotational speed determination, they all have common deficiencies in that the loss of an overspeed indicator disk means the loss of the safety of an overspeed protections system.

SUMMARY OF THE INVENTION

The present invention consists of two donut-shaped coded disks, one mounted on the drive shaft of the centrifuge and the other mounted on the centrifuge rotor. The coded disk mounted on the drive shaft or the speed control disk, consists of a notched surface, alternating notches and polished areas, machined into the drive system hub. The coded disk mounted on the rotor consists of a plurality of alternately darkened and polished areas the number of which indicates the maximum safe rotational speed for which the rotor is desinged. Optical emitter sensor assemblies are used to produce speed control and overspeed signals. By sensing the light reflected back to the optical sensor from the drive system hub, the rotational speed of the centrifuge is indicated. By sensing the light reflected back to the optical sensor from the overspeed disk mounted on the rotor, the rotation of the rotor is detected. The total number of reflected stripes on the overspeed disk always exceeds the number of notches on the speed control notched surface on the drive system hub. Thus, the frequency of the signals generated by the overspeed disk will always be greater than the frequency generated by the speed control surface. Signals having frequencies corresponding to the light pulses reflected back to the optical sensors are fed into a frequency discriminator circuit. In the absence of an overspeed disk, the speed control frequency will exceed that of the overspeed disk. Adhesive residue to render the present invention ineffective would have to be equally spaced in equal amounts and produce a pulsing signal having a greater frequency of the speed control indicator. When the speed control frequency is greater than the overspeed frequency, an output is issued from the frequency discriminator circuit which sets a latch circuit disabling the power input to the centrifuge.

As can be seen, the absence of the overspeed indicator will disable the centrifuge whether or not adhesive residue from the overspeed disk remains when the disk has been removed. Thus, although prior art discloses many methods for overspeed detection, nothing in prior art discloses an apparatus and method to consistently detect the absence of this critical safety device.

DESCRIPTION OF THE PREFERRED EMBODIMENT

Figure 1:
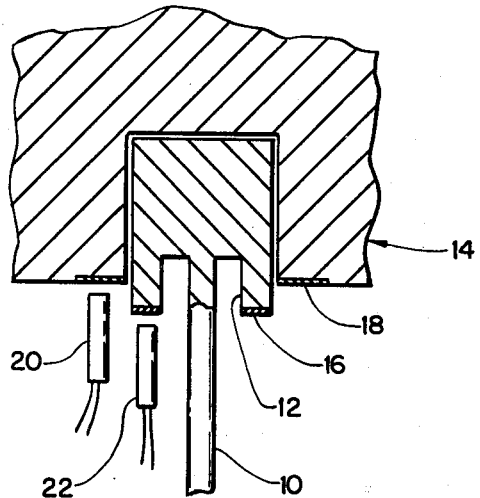
FIG. 1 is a diagrammatic side view of the drive portion of a centrifuge.
Figure 2:
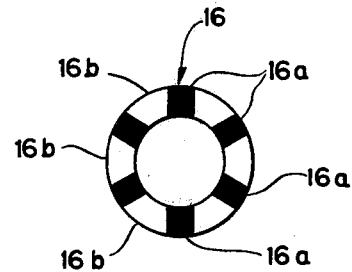
FIG. 2 is a bottom view of the drive system hub of the centrifuge of FIG. 1.
Figure 3:
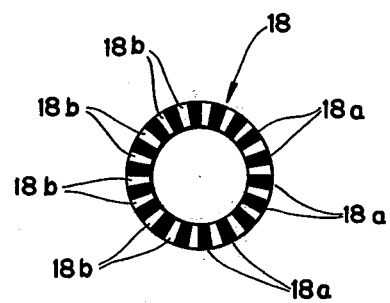
FIG. 3 is a bottom view of the overspeed disk of the centrifuge of FIG. 1.

FIG. 1 illustrates the drive portion of a centrifuge having a drive shaft 10 connected to a drive hub 12 which is rotatably coupled with a rotor 14. A drive system hub 16 (shown in FIG. 2) is shown as comprising the bottom-most portion of U-shaped drive hub 12. Adhering to the bottom of rotor 14 is an overspeed disk 18 (shown in FIG. 3). Associated with overspeed disk 18 is an overspeed optical sensor assembly 20 while associated with drive system hub 16 is a speed control optical sensor assembly 22.

When drive shaft 10 is rotated, drive hub 12 and rotor 14 will also rotate. While the centrifuge is operating, speed control optical sensor assembly 22 and overspeed optical sensor assembly 20 are emitting light beams focused on hub 16 and disk 18, respectively. The surface of drive system hub 16, shown in FIG. 2, and of overspeed disk 18, shown in FIG. 3, consist of darkened areas 16a and 18a, respectively, and light reflective areas 16b and 18b, respectively. Essential to the present invention is the fact that overspeed disk 18 consists of a greater number of darkened areas 18a and light reflective areas 18b than the darkened areas 16a and light reflective areas 16b of drive hub 16. With the configuration illustrated, overspeed disk 18 will always produce a higher frequency than drive hub 16. The segmented portions may vary for different speed rotors but preferably always will consist of a greater number than the segmented portions of drive hub 16. While in operation, the focused light from optical sensor assemblies 22 and 20 is transmitted to drive hub 16 and overspeed disk 18 which in turn reflect portions of light while absorbing other portions of the light rays. The reflected portions are reflected back to the optical sensor assemblies 22 and 20 as outputs having definite frequencies (see FIGS. 4A and 4C). The outputs of optical sensor assemblies 22 and 20 will also be transmitted to speed control circuitry (not shown) which is explained in detail in U.S. Pat. No. 3,436,637 to Robert J. Ehret.

Figure 4A:
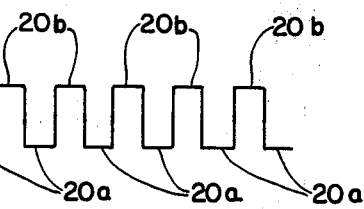
FIGS. 4A, 4B, and 4C are graphical representations of the potential outputs of the optical sensor assemblies of FIG. 1.
Figure 4B:
Figure 4C:
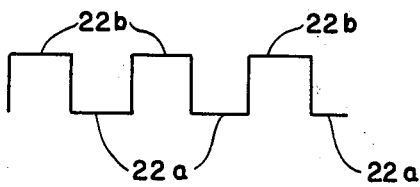

FIGS. 4A, 4B and 4C illustrate various outputs of optical sensor assemblies 20 and 22. FIG. 4A illustrates the output of overspeed optical sensor assembly 20 when overspeed disk 18 is present. The pulses 20b represent the reflected light pulses received by assembly 20 when light is incident on polished surfaces 18b of disk 18. The zero areas 20a represent the darkened areas 18a of disk 18. FIG. 4B illustrates a typical output of assembly 20 when disk 18 is removed. The peaks illustrated represent shiny metallic areas of rotor 14 while the amplitudes near zero represent areas of rotor 14 covered with adhesive residue and/or dirt.

FIG. 4C illustrates the output of speed control optical sensor assembly 22. The pulses 22b represent the reflected light pulses received by assembly 22 when focused light is incident on the polished areas 16b of drive system hub 16. The zero areas 22a represent the nonreflective areas 16a of drive system hub 16.

Figure 5:
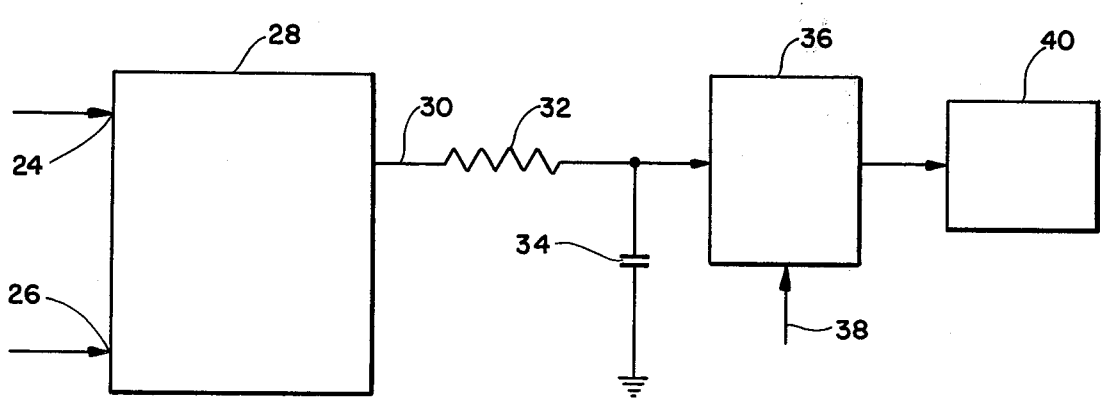
FIG. 5 is a block schematic diagram of the overspeed disk detection circuit.

Referring now to FIG. 5, the overspeed disk detection circuit is shown as having an overspeed input 24 and a speed control input 26 to a frequency discriminator circuit 28. Overspeed input 24 receives a signal having a frequency similar to that illustrated in FIG. 4A when overspeed disk 18 is present and a signal similar to that illustrated in FIG. 4B when overspeed disk 18 is absent. Speed control input 26 receives an input similar to that illustrated in FIG. 4C from the light reflected by drive hub 16. It should be noted that although the speed control assembly is illustrated comprising segmented drive system hub 16 and optical sensor assembly 22, a conventional tachometer assembly may be used as long as the frequency received at input 24 is greater than the frequency received at input 26. Circuit 28 has a single output 30 which is processed through a filter network comprising a resistor 32 and a capacitor 34 and is the input to a latch circuit 36. Frequency discriminator circuit 28 is well known in the art such as CD4046 manufactured by Radio Corporation of America or a circuit 28 may comprise an inverter (not shown) receiving the input from speed control optical sensor assembly 22. The inverted input may then be fed through an integrator (not shown). The integrated input from speed control optical sensor assembly 22 is combined with the input from overspeed optical sensor assembly which may also pass through an integrator (not shown). The combined signal may then be further processed to provide an output when the overspeed input 24 has a frequency greater than that of speed control input 26. Thus, latch circuit 36 which is also well known in the art such as bistable latch CD4001 manufactured by Radio Corporation of America will receive no input from the frequency discriminator circuit 28 as long as the frequency transmitted from speed control tachometer 22 is less than the frequency transmitted from overspeed optical sensor assembly 20. Any transient voltages transmitted from frequency discriminator circuit 28 will be filtered out through filter resistor 32 and filter capacitor 34. Latch circuit 36 operates to supply power flow through latch circuit 36 to the centrifuge 40 unless the loss of disk 18 occurs. Latch 36 will block power flow in the absence of disk 18 until the power flow is reconnected through reset 38 which may be either of a manual or electronic type.

In actual operation frequency discriminator circuit 28 has no output unless overspeed disk 18 has fallen off of rotor 14. While overspeed disk 18 is present, the frequency input at input 24 will always exceed the frequency input at speed control input 26.

As can be seen from the foregoing description, centrifuge 40 will not operate unless the safety feature represented by overspeed disk 18 is present. As such, the centrifuge will be incapable of being driven at a greater maximum design speed than that for which the centrifuge rotor has been designed.

While a specific embodiment of the invention has been shown and illustrated, it is to be understood that this embodiment is by way of example only and not to be construed as limiting the invention thereto but only in the proper scope of the appended claims.

What is claimed is:

1. An apparatus for determining the absence of an overspeed indicator in a centrifuge system having a centrifuge speed indicator, having a plurality of light reflective segments, coupled to a centrifuge drive assembly and a rotor speed indicator, having a greater number of light reflective segments than the speed indicator, coupled to a rotor, said apparatus comprising:
    a first means associated with the centrifuge speed indicator for detecting the speed of the centrifuge and producing a signal having a first frequency proportionate thereto;
    a second means associated with the rotor speed indicator for detecting the speed of the rotor and producing a signal having a second frequency proportionate thereto;
    circuit means connected to said first means and said second means for receiving and comparing said first frequency and said second frequency; and
    switch means connected to said circuit means for disabling operation of the centrifuge when said first frequency exceeds said second frequency.

2. The apparatus of claim 1 wherein said first means includes an optical sensor assembly and the centrifuge speed indicator comprises a coded reflective disk mounted on the centrifuge drive assembly.

3. The apparatus of claim 2 wherein said second means includes a second optical sensor assembly and the rotor speed indicator comprises a second coded reflective disk mounted on the bottom of said rotor.

4. The apparatus of claim 3 wherein said switch means includes a solid state latch circuit.

5. The apparatus of claim 4 wherein said solid state latch circuit includes a manual reset means.

6. The apparatus according to claim 4 wherein said solid state latch circuit includes an electronic reset means.

7. An apparatus for determining the absence of an overspeed indicator in a centrifuge system having a drive shaft, a rotor, and an optical sensor means for transmitting continuous wave light, receiving reflected light and producing an output proportionate thereto, said apparatus comprising:
    a first means connected to the drive shaft and associated with the optical sensor means for producing an output having a first frequency proportionate to the rotational speed of the drive shaft;
    a second means mounted on the rotor and associated with the optical sensor means for producing an output having a second frequency greater than said first frequency;
    circuit means connected to the optical sensor means for receiving and comparing said first frequency and said second frequency; and
    switch means connected to said circuit means for disabling operation of the centrifuge system when said first frequency exceeds said second frequency.

8. The apparatus of claim 7 wherein said first means comprises a donut-shaped disk having darkened areas and polished areas.

9. The apparatus according to claim 7 wherein said first means comprises a series of notches machined into the drive shaft.

10. The apparatus according to claim 7 wherein said second means comprises a donut-shaped disk having darkened areas and polished areas.

11. The apparatus according to claim 10 wherein said switch means comprises a solid state latch circuit.

12. The apparatus according to claim 10 wherein said solid state latch circuit includes reset means.

13. A method for determining the absence of an overspeed disk in a centrifuge system having an overspeed assembly including a coded overspeed disk and an optical sensor to produce an output having a first frequency, a speed control assembly including a speed sensor to produce an output having a second frequency indicative of rotational speed, a drive assembly and a rotor rotatably fixed to the assembly, said method including the steps of:
    sensing the first frequency produced by the optical sensor;
    sensing the second frequency indicative of rotational speed;
    comparing said first frequency with said second frequency; and
    disabling the centrifuge system when said second frequency exceeds said first frequency.

14. An apparatus for determining the absence of an overspeed disk in a centrifuge system having a rotor, a drive shaft, and an optical sensor assembly for determining the speed of the rotor and the speed of the drive shaft, said apparatus comprising:
    a coded disk mounted on the rotor consisting of alternate darkened and polished areas and associated with the optical sensor assembly to produce an output indicative of the frequency of reflected light from the polished areas of the coded disk;
    a coded means rotatably mounted on the drive shaft and associated with the optical sensor assembly having alternate reflective and nonreflective areas to produce a second frequency indicative of the light reflected from said reflective areas, said coded means having fewer reflective areas than said coded disk;
    circuit means connected to said optical sensor assembly for receiving and comparing said first frequency and said second frequency; and
    switch means for disabling said centrifuge whenever said second frequency is greater than said first frequency.

* * * * *